AUTOMATIC GAIN CONTROL CIRCUIT WITH DOUBLE TIME CONSTANT

Filed July 16, 1958

2 Sheets-Sheet 1

INVENTOR.
BERTRAM A. TREVOR
BY
Charles H. Brown
ATTORNEY

INVENTOR.
BERTRAM A. TREVOR
BY
Charles H. Brown
ATTORNEY

United States Patent Office 2,957,074

Patented Oct. 18, 1960

2,957,074

AUTOMATIC GAIN CONTROL CIRCUIT WITH DOUBLE TIME CONSTANT

Bertram A. Trevor, Tucson, Ariz., assignor to Radio Corporation of America, a corporation of Delaware Filed July 16, 1958, Ser. No. 748,997

18 Claims. (Cl. 250—20)

This invention relates to an improved automatic gain control (AGC) circuit for amplifiers, and more particularly to a circuit for developing an AGC voltage having characteristics especially suitable for use in single sideband (SSB) communications receivers.

For SSB communications as presently practiced, it is common to suppress the transmitted carrier, resulting in a single sideband suppressed carrier (SSBSC) signal. In SSBSC communications operating with voice, essentially no signal is transmitted between pauses in speech. It has been common practice, in SSBSC voice communications, to use a fast attack and slow release AGC circuit. The attack time must be fast enough to ensure proper reception of the first spoken syllable at the start of transmission, or in other words, fast enough so that the receiver gain is reduced almost immediately with the start of transmission. The slow release was necessary to prevent noise from appearing in the receiver output between spoken syllables, or during very short pauses in speech. However, too slow a recovery time or release time is undesirable in net operation, because then a weak signal immediately following a strong one will not be received. Thus, some sort of a compromise in the recovery time would be necessary.

For reception of double sideband (DSB) signals, theoretically an AGC circuit with very fast recovery could be used, since in this case the carrier is present at all times, even between pauses in speech or between spoken syllables. However, an AGC circuit with very fast recovery tends to degenerate audio frequencies in the lower portion of the audio spectrum. In this case also, too slow a recovery time is undesirable in net operation, for the same reason as stated in the preceding paragraph; so, some sort of a compromise in recovery time would be again necessary.

An object of this invention is to provide a novel AGC circuit for receivers.

Another object is to provide a receiver AGC circuit for SSBSC communications which has in effect a sufficiently slow release to prevent noise from appearing between spoken syllables, yet has an overall recovery time or release time which is sufficiently fast to avoid any adverse effects in net operation.

A further object is to provide a receiver AGC circuit for DSB reception which has in effect a sufficiently slow recovery to prevent degeneration of the lower audio frequencies, yet has an overall recovery time sufficiently fast to avoid any adverse effects in net operation.

The objects of this invention are accomplished, briefly, in the following manner: A voltage, proportional to the signal strength in the receiver, is developed in the receiver AGC circuit. Two capacitors, of different capacitance values, are charged from respective unequal portions of this voltage. The voltage across one of these capacitors is used as the AGC voltage, and by means of a controlled discharge path, the voltage across this capacitor is caused to vary in such a way that the start of AGC recovery is delayed for a certain predetermined time interval beginning with the removal or cessation of the signal in the receiver. Following this initial delay, a relatively fast AGC recovery is caused to take place. The same basic circuit used for SSBSC reception is also used for DSB reception, but in the latter case, one of the two capacitors is changed by switching to give less delay and faster recovery.

For SSBSC reception, if the start of AGC recovery is delayed, receiver gain will remain constant during short pauses between spoken syllables, and a faster AGC recovery (faster than was possible, as a practical matter, in prior schemes) may be used following the delay. For DSB reception, an AGC recovery delay as small as 20 milliseconds will effectively prevent the degeneration of lower audio frequencies (which would occur with a fast recovery AGC without delay), and will allow use of fast AGC recovery following the delay.

A detailed description of the invention follows, taken in conjunction with the accompanying drawings, wherein.

Figure 1:
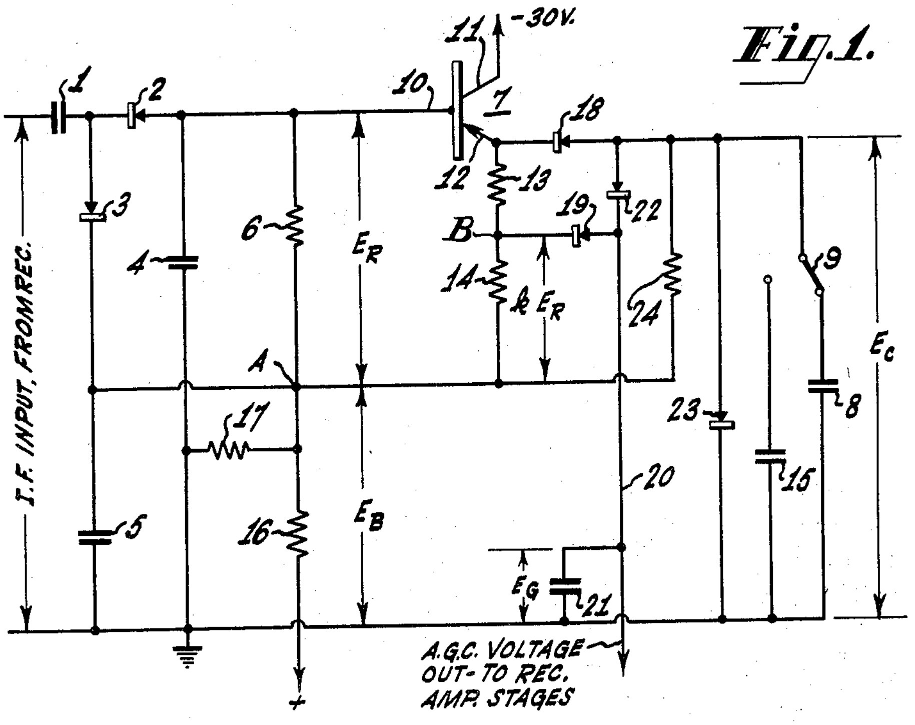
Fig. 1 is a circuit diagram of an AGC circuit according to this invention.

Referring first to Fig. 1, intermediate frequency (IF) input to the AGC circuit of the invention is taken off from a suitable point in the IF amplifier stages of the radio receiver which is to have its gain automatically controlled, and is fed through a coupling capacitor 1 to a voltage doubler rectifier circuit. This latter circuit is quite conventional and includes two diodes 2 and 3 and two capacitors 4 and 5, the series combination of diode 3 and capacitor 5 being connected in parallel with the series combination of diode 2 and capacitor 4, but diode 2 being poled oppositely from diode 3. The IF input voltage is rectified and doubled by the circuit 2–5, developing a negative D.C. voltage $E_R$ across a load resistor 6 which is connected between the anode of diode 2 (and also the ungrounded terminal of capacitor 4) and the cathode of diode 3 (and also the ungrounded terminal of capacitor 5). The voltage $E_R$ is proportional to the strength of the IF signal in the receiver.

A PNP junction transistor 7 is used as a low-output-impedance coupling stage for applying the voltage $E_R$ to a first storage means such as a capacitor 8 selected by a single-pole, double-throw switch 9. Transistor 7 has a base electrode 10, a collector electrode 11, and an emitter electrode 12. This transistor is connected in emitter-follower fashion. One end of load resistor 6 is connected to base 10, the collector 11 is biased negatively by a connection to the negative terminal —30 v. of a suitable power supply, and the emitter 12 is coupled through two series-connected resistors 13 and 14 to the other end of load resistor 6. The transistor coupling stage 7 thus provides a low (output) impedance signal source at the emitter 12. This low impedance source is desired to provide high charging current to the time constant capacitor 8 (or capacitor 15, if switch 9 is in its other position), in order to achieve a fast attack time for the AGC.

A fixed voltage $E_B$, positive with respective to ground, is provided at point A (the lower end of resistor 6). This voltage $E_B$ may be obtained by making point A the intermediate point on a voltage divider comprising two resistors 16 and 17 connected in series between the positive terminal of a power supply and zero potential or ground. The voltage (with respect to ground) on base electrode 10, when a signal is present in the receiver, will thus be the algebraic sum of the positive voltage $E_B$ and the larger negative voltage $E_R$. In a transistor coupling stage connected as described, the voltage between the transistor base 10 and emitter 12 is small. Therefore, the voltage at emitter electrode 12 will also be the algebraic sum of the positive voltage $E_B$ and the larger negative voltage $E_R$. By way of example, $E_B$ may be +8 volts and the maximum value of $E_R$ may be −30 volts, making the voltage at emitter 12, −22 volts with respect to ground.

A diode 18 has its cathode connected to emitter 12 and its anode connected to the arm of switch 9, and through this arm (when switch 9 is in the "SSB" position illustrated) to the upper plate of capacitor 8, the lower plate of this capacitor being grounded. When switch 9 is in its other or "DSB" position, the anode of diode 18 is connected to the upper plate of capacitor 15, the lower plate of this capacitor being grounded. The voltage denoted by $E_C$ is the voltage across the capacitor 8 or the capacitor 15, depending on the position of switch 9. Diode 18 is poled so that $E_C$ assumes the value $E_B-|E_R|$, on application of the IF input signal to the circuit shown. This value is −22 volts, under the conditions previously assumed. The circuit is so designed that the voltage $E_B-|E_R|$ (at emitter electrode 12) is always negative as long as $|E_R|>E_B$, and thus diode 18 then is biased in the forward or low resistance direction. Since this is so, and since transistor 7 provides a low impedance signal source, the capacitor 8 (or capacitor 15) is charged very rapidly, so that $E_C$ very rapidly assumes the value $$E_B-|E_R|$$

on application of an IF input signal to the AGC circuit.

The series resistors 13 and 14 together function as a voltage divider supplied by voltage $E_R$, whereby a voltage $kE_R$ (where $k$ is a constant between zero and unity) appears across resistor 14. A diode 19 has its cathode connected to the junction point B of resistors 13 and 14 and its anode connected to the lead 20, which is the AGC output lead of the circuit. A capacitor (second storage means) 21, whose capacitance is small compared to that of either capacitor 8 or capacitor 15, is connected from lead 20 to ground. The AGC output voltage $E_G$ appears across capacitor 21, and this voltage $E_G$ (lead 20 with respect to ground) is fed as a gain-controlling voltage to one or more of the amplifier stages in the radio receiver. Diode 19 is so poled that $E_G$ assumes the value $$E_B-k|E_R|$$

on application of the IF input signal, since the lower end of resistor 14 is at a potential of $E_B$ with respect to ground. The factor $k$, by way of example, may be ⅔, so that under the conditions previously assumed the ACG output voltage $E_G$ will be −12 volts. The design is such that the voltage $E_B-k|E_R|$ (at B) is always negative (as long as $|kE_R|>E_B$), and thus diode 19 is then biased in the forward or low resistance direction.

A diode 22 has its anode connected to the anode of diode 18 and its cathode connected to the lead 20 (or anode of diode 19). Under the conditions assumed, the voltage on the anode of diode 22, $E_C$, is −22 volts, while the voltage on the cathode of this same diode, $E_G$, is −12 volts. Under these conditions, then, diode 22 is biased 10 volts in the backward or reverse direction, and is non-conducting.

A clamping device (diode 23) is connected across whichever one of the capacitors (8 or 15) is in use at the moment. Diode 23 has its anode connected to the ungrounded plate of these capacitors (voltage $E_C$) and its cathode connected to ground. Under the assumed conditions, $E_C$ is −22 volts, so diode 23 is biased in the backward or reverse direction, and is non-conducting.

A discharge circuit comprising a resistor 24 is coupled from the upper plate of capacitor 8, or capacitor 15, (again depending on the position of switch 9) to point A, at $E_B$ potential.

The connections described, including the connection of the lower ends of resistors 6 and 14 to the $E_B$ potential point A, comprise means for algebraically combining the entire voltage $E_R$, or a portion $k$ of this voltage, with the fixed voltage $E_B$. A coupling extends by way of diode 22 between the first storage means 8 (or 15) and the second storage means 21. The diode 22 is a unidirectional current-conducting device, or an asymmetrical conductor.

As previously described, upon application of a receiver IF signal to the AGC circuit illustrated, a voltage $E_R$ proportional to the strength of this signal is developed by the voltage doubler rectifier circuit. Assuming the switch 9 is in the position illustrated, capacitor 8 is charged very rapidly, by way of transistor 7, to a (negative) voltage $E_C=E_B-|E_R|$, and the smaller capacitor 21 is charged very rapidly to a (negative) voltage $E_G=E_B-k|E_R|$. This latter voltage is used as an AGC voltage, and it may be seen that a fast attack AGC arrangement is provided. This attack time is fast enough to ensure proper reception of the first spoken syllable at the start of a transmission. The AGC voltage $E_G$ being negative as compared to its between-transmission value of zero volts, the gain of the receiver is reduced, due to an increased negative bias on the amplifier tubes, by an amount proportional to the signal strength, when a signal appears in the receiver.

Upon cessation of the signal in the receiver, the IF input to the AGC circuit is removed. This causes the voltages $E_R$ and $kE_R$ to go to zero, since the receiver signal strength has now fallen to zero. As a result, the potential at collector electrode 12, and also that at point B, are left at $E_B$, or +8 volts. Diode 18 is non-conducting, having a cathode potential of +8 v. and an anode potential ($E_C$) of −22 v. Diode 19 is nonconducting, having a cathode potential of +8 v. and an anode potential ($E_G$) of −12 v. Diode 22 is nonconducting, having a cathode potential ($E_G$) of −12 v. and an anode potential ($E_C$) of −22 v.

The AGC voltage $E_G$ is maintained at −12 v. by the small capacitor 21, and the capacitor 8 (or 15) starts to discharge through resistor 24, which is connected between the selected capacitor and the +8 v.-potential point A. The voltage $E_C$ thus decays exponentially from −22 v. toward +8 v. It may be seen that diode 22 has the voltage $E_G$ on its cathode and the voltage $E_C$ on its anode. After a certain time delay, determined as hereinafter described, $E_C$ reaches a value equal to $E_G$, namely −12 v. When this happens, the voltages on the two electrodes of diode 22 are equal, and this diode becomes conducting. From this instant on, $E_C$ and $E_G$ will be equal and will decay together, the coupling from capacitor 21 to discharge resistor 24 now being completed through the conducting diode 22.

From the above, it may be seen that, when the IF input is removed, the AGC voltage $E_G$ remains constant for a time interval, and then decays or recovers. The start of AGC recovery is delayed for this time interval during which $E_G$ remains constant. This delay in the AGC recovery allows the receiver gain to remain constant during short pauses between syllables. Following this delay, the AGC recovery (the time during which $E_C$ and $E_G$ decay together) takes place, and a faster recovery may then be used.

As soon as $E_C$ and $E_G$ reach zero voltage, the clamping device (diode 23) comes into play. Diode 23 becomes conducting when its anode (coupled to $E_C$ and $E_G$) tends to go positive, thus preventing decay of $E_C$ and $E_G$ into the positive voltage region, which might otherwise occur since resistor 24 is connected to the positive potential point A. The AGC voltage $E_G$ is prevented from going positive with respect to ground, by the action of clamping diode 23.

Switch 9 is provided to switch in the smaller time constant capacitor 15, which may be used for DSB reception. This will give less recovery delay, and still faster AGC recovery.

Certain voltage values have been given previously, by way of example. Typical circuit constants will now be given, also by way of example.

| | | |
|---|---|---|
| Capacitor **1** | mfd | 0.01 |
| Capacitor **4** | mfd | 0.01 |
| Capacitor **5** | mfd | 0.01 |
| Capacitor **8** | mfd | 0.5 |
| Capacitor **15** | mfd | 0.05 |
| Capacitor **21** | mfd | 0.01 |
| Resistor **6** | kilohms | 470 |
| Resistor **13** | do | 33 |
| Resistor **14** | do | 68 |
| Resistor **24** | megohm | 1 |

Figure 3:
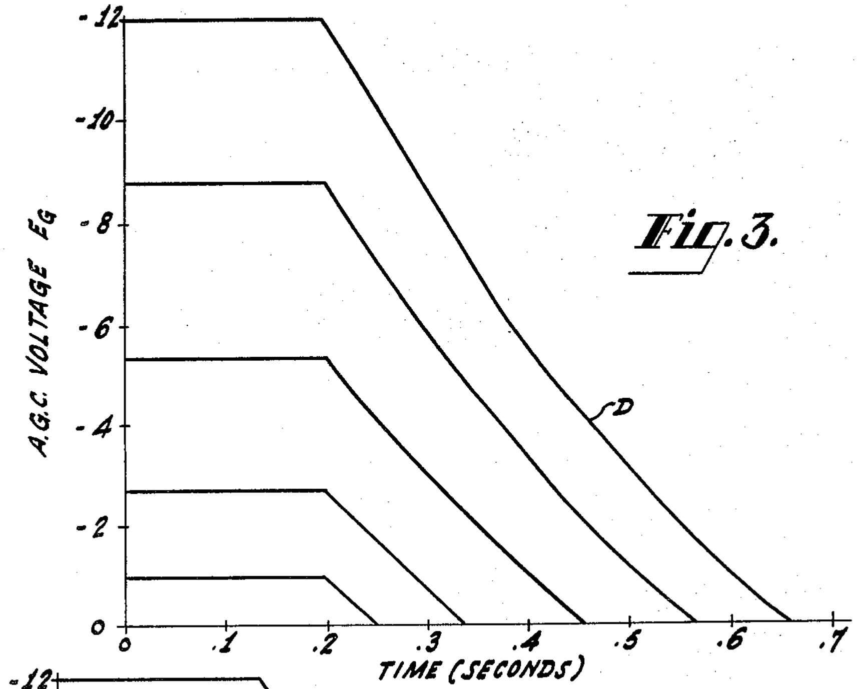
Figs. 3 and 4 are sets of curves giving typical AGC delay and recovery characteristics.
Figure 4:
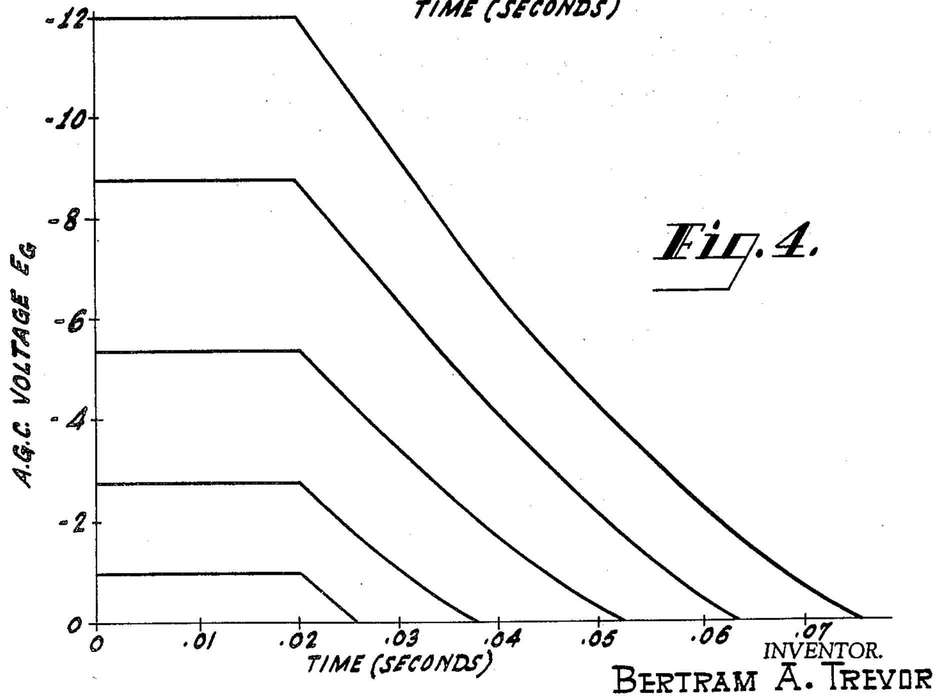

Typical delay and recovery characteristics, for the circuit constants and other values given by way of example, are illustrated in Fig. 3 for SSBSC reception (capacitor 8 connected into the circuit), and in Fig. 4 for DSB reception (capacitor 15 connected into the circuit.) In Fig. 3, the recovery delay for SSBSC reception is 0.2 second, and in Fig. 4 the recovery delay for DSB reception is 0.02 second (20 milliseconds). The curves of Figs. 3 and 4 show AGC voltage $E_G$ vs. time, assuming the signal input to the receiver was removed at $t=0$. The maximum AGC voltage in both of these figures is −12 v., which corresponds with maximum allowable receiver input. Smaller receiver inputs develop correspondingly smaller AGC voltages, as shown by the family of curves in each figure. The delay and recovery times can be changed to other values, by a suitable choice of circuit constants.

It will be understood by those skilled in the art that the automatic gain control circuit of this invention may readily be modified to provide a positive AGC voltage useful, for example, with transistorized apparatus. The latter may be a transistorized receiver. To provide a positive AGC voltage, the polarity of the 30 v. supply shown as being connected to the electrode 11 is changed. The polarity of $E_B$ is also changed. The diodes shown in Fig. 1 are reversed and an NPN transistor is to be substituted.

Figure 2:
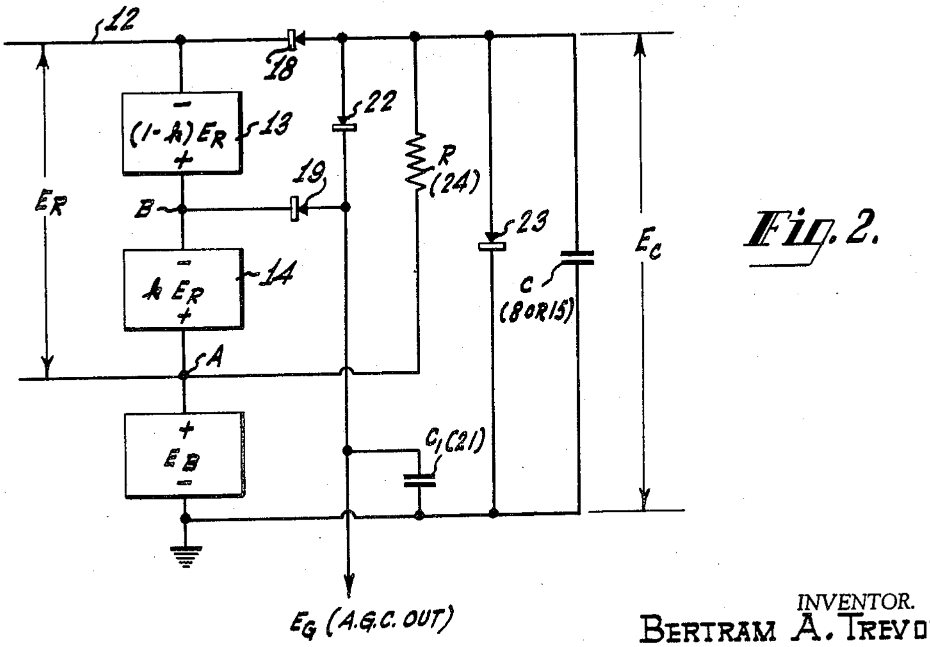
Fig. 2 is the same circuit as that in Fig. 1, drawn in simplified, equivalent form.

More precise and general characteristics of the AGC circuit of this invention will now be developed in connection with Fig. 2, which is a simplified showing of a portion of the Fig. 1 circuit, in equivalent circuit form. Fig. 2 shows the essentials of the Fig. 1 circuit, from emitter electrode 12 on.

It is assumed that the maximum overall receiver gain up to the AGC circuit input will be about 120 db. Minimum gain will be about zero db. If four tubes of the 6BA6 type are controlled by the AGC voltage, each one must cover a range of 30 db. This requires a bias range of approximately 12 volts. The analysis given below shows that the maximum AGC rectifier output $E_R$ must be −30 v., and the bias $E_B$ at point A must be +8 v., to give an AGC bias $E_G$ of −12 v. This also satisfies the condition that the receiver output will not drop more than 8 db when the input signal is reduced by 80 db, at which time the AGC bias is zero volts.

From Fig. 2, with constant signal input, $$E_G=E_B-k|E_R| \qquad (1)$$

and $$E_C=E_B-|E_R| \qquad (2)$$

Denote the maximum-gain values of $E_G$ and $E_R$ as $E_{G1}$ and $E_{R1}$, respectively. Also, denote the minimum-gain values as $E_{G2}$ and $E_{R2}$, respectively. From the above, $E_{G1}=0$, $E_{G2}=-12$, and $E_{R2}/E_{R1}=2.5$ (8 db). Therefore, from Equation 1, $$E_B=k|E_{R1}| \qquad (3)$$

and $$E_B=k|E_{R2}|-12 \qquad (4)$$

Equations 3 and 4 give $$|E_{R2}|-|E_{R1}|=12/k \qquad (5)$$

Since $E_{R1}=.4E_{R2}$, Equation 5 becomes $$|E_{R2}|=20/k \text{ and } |E_{R1}|=8/k \qquad (6)$$

Before removal of the signal, $E_G$ and $E_C$ are given by Equations 1 and 2. On removing the input signal at time $t=0$, $E_G$ is held constant by the capacitor $C_1$, and $E_C$ changes in the positive direction due to the discharge of the RC combination. The right-hand term of Equation 2 will decay exponentially, giving $$E_C=E_C-|E_R|e^{\frac{-t}{T}} \qquad (7)$$

where $T=RC$ (see Fig. 2). $E_G$ remains constant as long as $E_C$ is negative with respect to $E_G$. This relation holds for the time period from $t=0$ to $t=t_d$. The recovery delay ends at a time $t_d$ when $E_C=E_G$, or from Equation 1, when $E_C=E_B-k|E_R|$. Substitution in Equation 7 gives $$k=e^{\frac{-t}{T}} \qquad (8)$$

or $$+d/T=-\log_e k \qquad (9)$$

providing $$|kE_R|/E_B>1$$

and also providing that C is large compared to $C_1$. It is to be noted that $t_d$ is independent of signal strength, as long as $$|kE_R|/E_B>1, \text{ or } |kE_R|>E_B$$

The above analysis may be summarized as follows: Upon removal of the signal at time $t=0$, the AGC voltage $E_G$ remains constant for a time $t_d$ given by Equation 9. For a time $t$ greater than $t_d$, $E_G$ is the same as $E_C$ given by Equation 7, this being true as long as $E_C$ is negative. In this connection, it is noted that the diode clamp 23 across C will not allow $E_C$ to go positive.

The total recovery time, $t_r$, from $t=0$ to the time when $E_G=0$, is from Equation 7, $$t_r/T=-\log_e\left(\frac{E_B}{|E_R|}\right) \qquad (10)$$

For the constants given previously by way of example, $k=.67$, and $T=.5$ (capacitor 8 of .5 mfd. times resistance 24 of 1 megohm) for SSB reception. Note that for DSB reception, when capacitor 15 of .05 mfd. is used, the value of T would be .05. Then, from Equations 6, $|E_{R2}|=30$ v. and $|E_{R1}|=12$ v. From Equations 3 and 4, $E_B=8$ v. Also, previously assumed, $E_{G1}=0$, and $|E_{G2}|=12$ v. Then, from Equation 9, $t_d/T=.4$, and since $T=.5$, then $t_d=.2$ second. Then, from Equation 10, the maximum recovery time, for the maximum $E_{R2}$ of 30 v., is .66 second.

Referring again to Fig. 3, and since $t_d$ is essentially independent of signal strength, the family of curves all show a time delay $t_d$ of 0.2 second, and the curve D for the maximum AGC voltage $E_G$ of 12 volts has a time-axis intercept (representing the maximum recovery time $t_r$) of .66 second.

What is claimed is:

1. A circuit for producing an automatic gain control voltage for a radio receiver comprising means responsive to the signal present in said receiver for developing a voltage proportional to the strength thereof and negative with respect to a reference potential, first storage means, connections for applying said voltage to said storage means, second storage means, connections for applying a portion only of said voltage to said second storage means, a discharge circuit coupling said first storage means to a point having a predetermined potential positive with respect to said reference potential, a clamping device coupled to said first storage means for preventing the voltage thereacross from going positive with respect to said reference potential, a coupling between said first storage means and said second storage means, an asymmetrical conductor in said last-named coupling, and an output connection coupled to said second storage means.

2. A circuit for producing an automatic gain control voltage for a radio receiver comprising means responsive to the signal present in said receiver for developing a voltage proportional to the strength thereof, first storage means, connections including a device providing a low output impedance for applying said voltage to said storage means; second storage means, connections for applying a portion only of said voltage to said second storage means, a time constant discharge circuit coupled to said first storage means, a coupling between said first storage means and said second storage means, an asymmetrical conductor in said last-named coupling arranged to conduct only when the voltage across said first and second storage means are approximately equal, and an output connection coupled to said second storage means.

3. A circuit for producing an automatic gain control voltage for a radio receiver comprising means responsive to the signal present in said receiver for developing a voltage proportional to the strength thereof and negative with respect to a reference potential, first storage means, connections for applying said voltage to said storage means, second storage means, connections for applying a portion only of said voltage to said second storage means, a time constant discharge circuit coupling said first storage means to a point having a predetermined potential positive with respect to said reference potential, a clamping device coupled to said first storage means for preventing the voltage thereacross from going positive with respect to said reference potential, a coupling between said first storage means and said second storage means, an asymmetrical conductor in said last-named coupling arranged to conduct only when the voltage across said first and second storage means are approximately equal, and an output connection coupled to said second storage means.

4. A circuit for producing an automatic gain control voltage for a radio receiver comprising means responsive to the signal present in said receiver for developing a voltage proportional to the strength thereof, first storage means, means for producing a fixed voltage, connections including means for combining algebraically said developed voltage and said fixed voltage and means for applying the resultant to said first storage means, second storage means, connections including means for combining algebraically a portion only of said developed voltage means and said fixed voltage and for applying the resultant to said second storage means, a discharge circuit coupled to said first storage means, a coupling between said first storage means and said second storage means, and an output connection coupled to said second storage means.

5. A circuit for producing an automatic gain control voltage for a radio receiver comprising means responsive to the signal present in said receiver for developing a voltage proportional to the strength thereof, first storage means, means for providing a fixed voltage, connections including means for combining algebraically said developed voltage and said fixed voltage and means for applying the resultant to said first storage means, second storage means, connections including means for combining algebraically a portion only of said developed voltage and said fixed voltage and means for applying the resultant to said second storage means, a discharge circuit coupled to said first storage means, a coupling between said first storage means and said second storage means, an asymmetrical conductor in said last-named coupling, and an output connection coupled to said second storage means.

6. A circuit for producing an automatic gain control voltage for a radio receiver comprising means responsive to the signal present in said receiver for developing a voltage proportional to the strength thereof and negative with respect to a reference potential, first storage means, connections including a device providing a low output impedance for applying said voltage to said storage means; second storage means, connections for applying a portion only of said voltage to said second storage means, a time constant discharge circuit coupling said first storage means to a point having a predetermined potential positive with respect to said reference potential, a clamping device coupled to said first storage means for preventing the voltage thereacross from going positive with respect to said reference potential, a coupling between said first storage means and said second storage means, an asymmetrical conductor in said last-named coupling arranged to conduct only when the voltages across said first and second storage means are approximately equal, and an output connection coupled to said second storage means.

7. A circuit for producing an automatic gain control voltage for a radio receiver comprising means responsive to the signal present in said receiver for developing a voltage proportional to the strength thereof, first storage means, means for providing a fixed voltage, connections including means for combining algebraically said developed voltage and said fixed voltage whose polarity is opposite to that of said developed voltage and means for applying the resultant to said first storage means, second storage means, connections including means for combining algebraically a portion only of said developed voltage and said fixed voltage and means for applying the resultant to said second storage means, a discharge circuit coupling said first storage means to a point whose potential is said fixed voltage, a coupling between said first storage means and said second storage means, an asymmetrical conductor in said last-named coupling, and an output connection coupled to said second storage means.

8. A circuit for producing an automatic gain control voltage for a radio receiver comprising means responsive to the signal present in said receiver for developing a voltage proportional to the strength thereof and negative with respect to a reference potential, first storage means, means for providing a fixed voltage positive with respect to said reference potential, connections including means for combining algebraically said developed voltage and said fixed voltage and means for applying the resultant to said first storage means, second storage means, connections including means for combining algebraically a portion only of said developed voltage and said fixed voltage and means for applying the resultant to said second storage means, a discharge circuit coupling said first storage means to a point whose potential is said fixed voltage, a clamping device coupled to said first storage means for preventing the voltage thereacross from going positive with respect to said reference potential, a coupling between said first storage means and said second storage means, an asymmetrical conductor in said last-named coupling, and an output connection coupled to said second storage means.

9. A circuit in accordance with claim 8, wherein said asymmetrical conductor is arranged to conduct only when the voltages across said first and second storage means are approximately equal.

10. A circuit for producing an automatic gain control voltage for a radio receiver comprising means responsive to the signal present in said receiver for developing a voltage proportional to the strength thereof and negative with respect to a reference potential, first storage means, connections including a device providing a low output impedance for combining algebraically said voltage and a fixed voltage positive with respect to said reference potential, and for applying the resultant to said storage means, second storage means, connections for combining algebraically a portion only of said developed voltage and said fixed voltage and for applying the resultant to said second storage means, a discharge circuit coupling said first storage means to a point whose potential is said fixed voltage, a clamping device coupled to said first storage means for preventing the voltage thereacross from going positive with respect to said reference potential, a coupling between said first storage means and said second storage means, an asymmetrical conductor in said last-named coupling, and an output connection coupled to said second storage means.

11. A circuit for producing an automatic gain control voltage for a radio receiver comprising means responsive to the signal present in said receiver for developing a voltage proportional to the strength thereof, a first capacitor, connections for applying said voltage to said capacitor, a second capacitor having a capacitance small as compared to that of said first capacitor, a voltage divider receptive of said developed voltage, a coupling between an intermediate point on said divider and said second capacitor, a discharge circuit coupled to said first capacitor, a coupling between said first capacitor and said second capacitor, a diode in said last-named coupling, and an output connection coupled to said second capacitor.

12. A circuit in accordance with claim 11, wherein the anode of said diode is connected to said first capacitor and the cathode of said diode is connected to said second capacitor.

13. A circuit in accordance with claim 11, including also a diode connected from said first capacitor to a point of reference potential.

14. A circuit in accordance with claim 11, including also a diode having its anode connected to said first capacitor and its cathode connected to a point of reference potential.

15. A circuit for producing an automatic gain control voltage for a radio receiver comprising means responsive to the signal present in said receiver for developing a voltage proportional to the strength thereof, a transistor having input and output electrodes; means for applying said voltage to said input electrodes, a first capacitor, a coupling from said output electrodes to said first capacitor, a second capacitor having a capacitance small as compared to that of said first capacitor, a voltage divider connected to said output electrodes, a coupling between an intermediate point on said divider and said second capacitor, a discharge circuit coupled to said first capacitor, a coupling between said first capacitor and said second capacitor, a diode in said last-named coupling, and an output connection coupled to said second capacitor.

16. A circuit in accordance with claim 15, including also a diode in the coupling between said output electrodes and said first capacitor.

17. A circuit in accordance with claim 15, including also a diode in the coupling between said intermediate divider point and said second capacitor.

18. A circuit in accordance with claim 15, including also a diode in the coupling between said output electrodes and said first capacitor, a diode in the coupling between said intermediate divider point and said second capacitor, and a diode connected from said first capacitor to a point of reference potential.

References Cited in the file of this patent

UNITED STATES PATENTS

| | | |
|---|---|---|
| 2,093,565 | Koch | Sept. 21, 1937 |
| 2,189,925 | Reinken | Feb. 13, 1940 |
| 2,515,196 | Coe | July 18, 1950 |
| 2,532,347 | Stodola | Dec. 5, 1950 |

UNITED STATES PATENT OFFICE

CERTIFICATION OF CORRECTION

Patent No. 2,957,074 October 18, 1960

Bertram A. Trevor

It is hereby certified that error appears in the above numbered patent requiring correction and that the said Letters Patent should read as corrected below.

Column 6, lines 10 and 11, equation (7) should appear as shown below instead of as in the patent:

$$E_C = E_B - |E_R| e^{\frac{-t}{T}}$$

line 13, after "as" strike out "long"; line 22, equation (9) should appear as shown below instead of as in the patent:

$$t_d/T = -\log_e k$$

(SEAL) Signed and sealed this 2nd day of May 1961.

Attest:

ERNEST W. SWIDER
Attesting Officer

DAVID L. LADD
Commissioner of Patents